Patented Oct. 24, 1922.

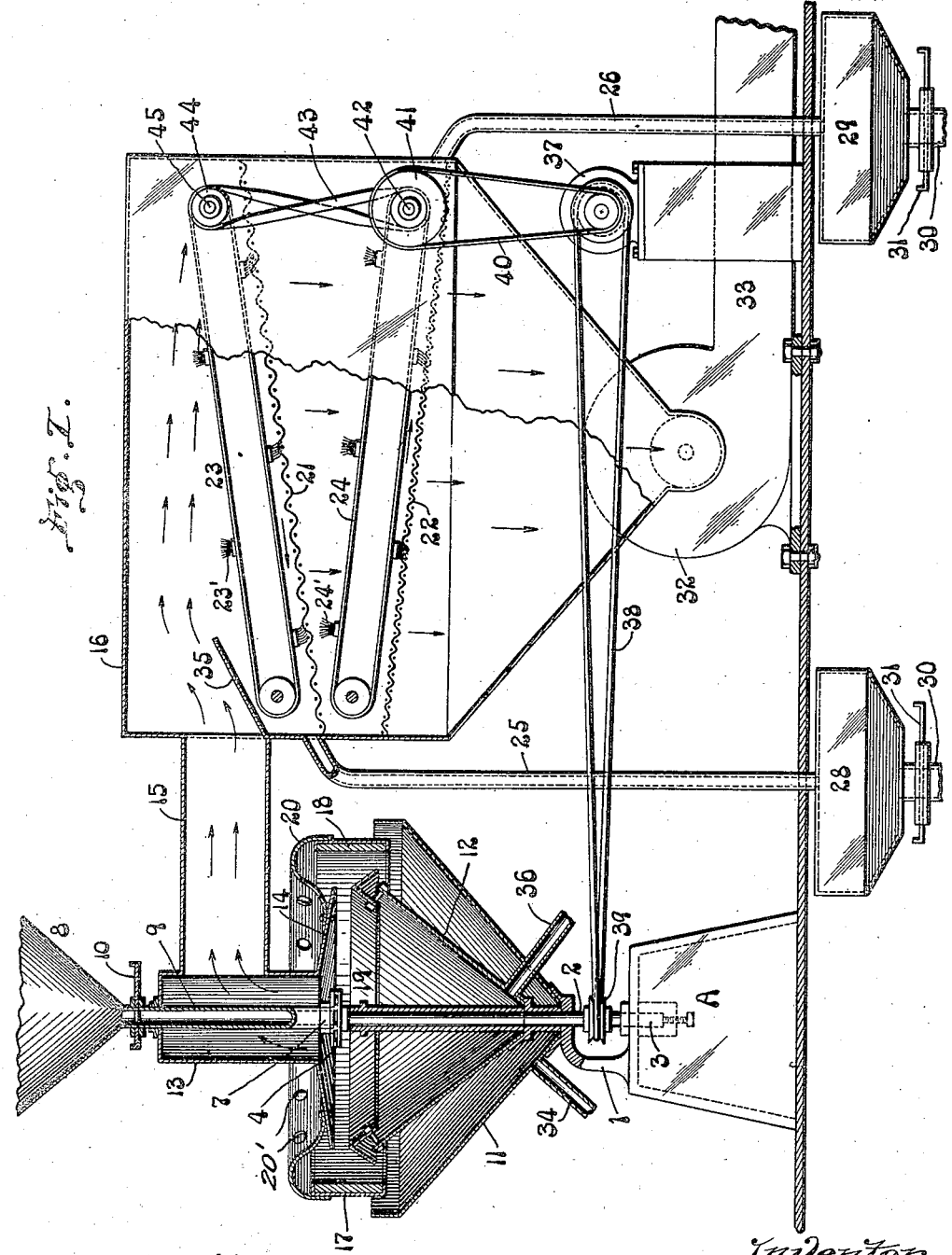

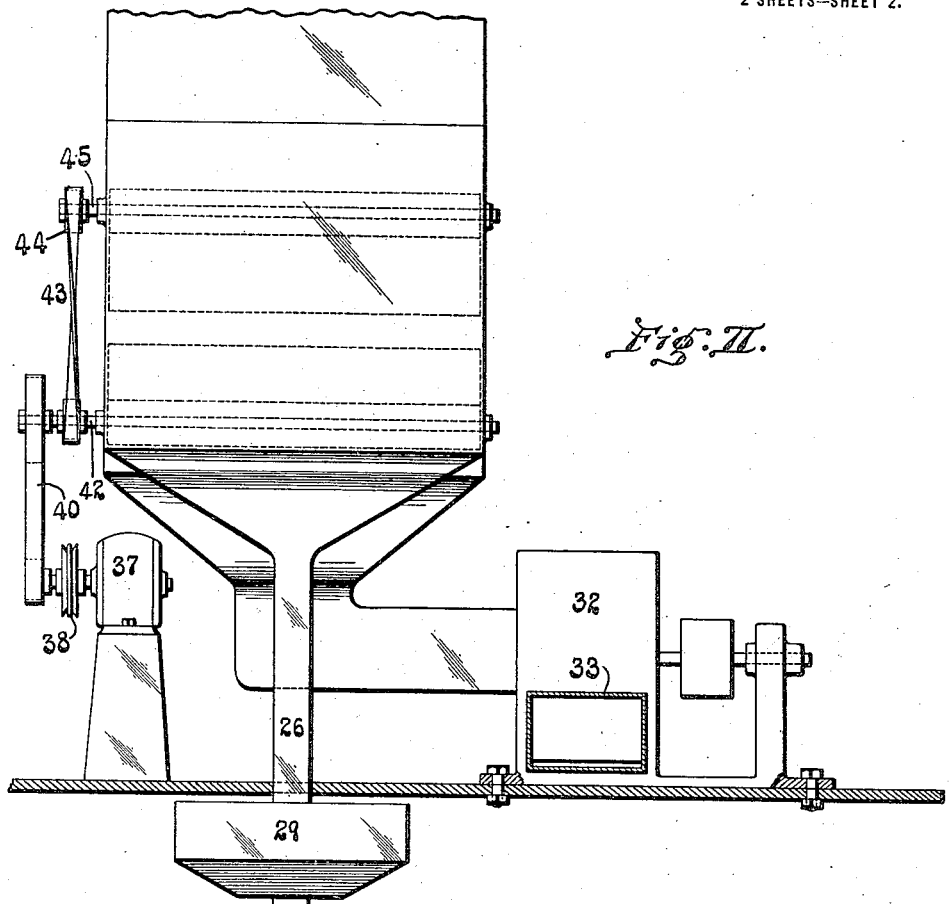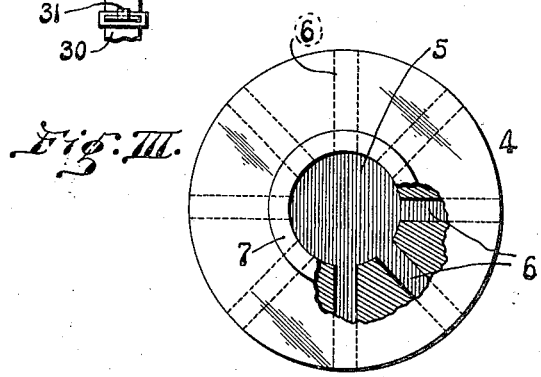

1,432,921

UNITED STATES PATENT OFFICE.

SWAN J. SWANSON, OF ST. LOUIS, MISSOURI, ASSIGNOR OF ONE-HALF TO OSCAR W. GERLEMAN, OF ST. PAUL, MISSOURI.

APPARATUS FOR SEPARATING GRAPHITE.

Application filed August 6, 1919. Serial No. 315,742.

*To all whom it may concern:*

Be it known that I, SWAN J. SWANSON, a citizen of the United State of America, a resident of the city of St. Louis, in the State of Missouri, have invented certain new and useful Improvements in Apparatus for Separating Graphite, of which the following is a full, clear, and exact description, reference being had to the accompanying drawings, forming a part of this specification.

Graphite as found in original deposits is combined with rock material and other impurities, and to obtain the graphite from the mined material it is necessary to first crush such material and thereafter separate the graphite from the particles of rock. The object of my invention is to provide an apparatus whereby a very high percentage of pure graphite in flake form may be separated from the crushed material containing graphite, and to attain this object the apparatus includes means for spreading the crushed material into a sheet formation within a suitable enclosure, allowing the heavier particles of rock to fall by gravity, and gathering the lighter flakes of graphite by an air current circulating through the sheets or streams of crushed material, whereby the flake graphite is effectually withdrawn from the heavier portions of material.

Fig. I is a side elevation, partly in longitudinal section, of my graphite separating apparatus.

Fig. II is an end view of the apparatus.

Fig. III is a top plan, partly in section, of the spreader wheel of the apparatus.

In the drawings I have shown my apparatus in its preferred form as comprising a hopper support A surmounted by a bracket 1, above which certain hoppers and other appurtenances are located, as will hereinafter fully appear.

A vertical shaft 2, extending through the bracket 1, rests upon an end thrust bearing 3, and to the upper end of said shaft is secured a spreader wheel 4 shown most clearly in Fig. III. This spreader wheel is formed with a central cavity 5 and with radial ducts 6 leading from said cavity to the perimeter of the wheel. At the top of the ejector wheel is an annular flange 7.

8 designates a supply hopper into which the crushed graphite bearing rock is introduced and 9 is a vertical pipe leading from said supply hopper to the spreader wheel 4, the lower end of said pipe being preferably loosely fitted within the annular flange 7 of said wheel. A gate 10 in the pipe 9 serves to control the delivery of material into said pipe from the hopper 8.

11 and 12 designate, respectively, outer and inner hoppers located at a lower level than the spreader wheel 4. Said hoppers 11 and 12 are concentric with the spreader wheel and separated, so that they constitute individual receptacles.

The pipe 9, leading from the supply hopper 8 to the spreader wheel 4, is surrounded by an air box 13, the lower end of which terminates above the spreader wheel 4, and at its lower end is an annular downwardly flaring deflector 14. The air box 13 has communication with an air duct 15 leading to a grading chamber 16, in which circulation of air is maintained, as will hereinafter fully appear, to create a suction through the air box and the duct 15.

17 designates a buffer preferably of cylindrical form surrounding the spreader wheel 4 and deflector 14 at a distance therefrom, the said buffer being preferably of cylindrical shape and located adjacent to and interiorly of the upper end of the hopper 11. The buffer includes a lining of suitably soft material 18 from which the hard particles of rock discharged thereagainst by the spreader wheel will not rebound greatly, but upon striking the buffer fall by gravity into the outer hopper 11.

The inner hopper 12 is surmounted by an angular deflector 19, preferably of V-shape in cross section, which is secured to the upper end of said hopper and serves to deflect any particles of rock rebounding from the buffer 18 so that they will be directed into the outer hopper 11 intended to receive them. The buffer 17 is supported by the air box 13 through the medium of a support 20 connecting said parts, said support being provided with a circumferential series of apertures 20′ and otherwise formed as to permit the descent of air toward the hoppers 11 and 12 in order that excessive suction will not occur in the air box 13, or in other words, to avoid a suction of such strength in the air box as to cause particles of rock discharged from the ejector wheel 4 to be carried upwardly into the air box 13.

Within the grading chamber 16 are inclined screens 21 and 22, varying in mesh and extending downwardly in opposite directions, the upper screen 21 being of coarse mesh and the lower screen 22 of finer mesh. Above the upper screen 21 is an open work carrier 23 and above the lower screen 22 is an open work carrier 24, these carriers being preferably of endless form and provided with brushes 23' and 24' adapted to sweep the flake graphite in downward courses along the screens 21 and 22 and cause the different grades of flake graphite to enter conduits 25 and 26 leading from the grading chamber at the lower ends of the screens, to air-tight receivers 28 and 29. Said receivers are provided with discharge pipes 30 nominally closed by gates 31.

A suitable suction fan (not shown) is located within a fan housing 32 having a dischargeway 33. Said fan housing 32 communicates with the interior of the grading chamber 16, and during the operation of the fan, suction is created in the grading chamber and also in the air duct 15 leading thereto and the air box 13 above the spreader wheel 4.

In the operation of my apparatus, the crushed graphite rock is fed to the spreader wheel 4 from the supply hopper 8 and by rapid rotation of said spreader wheel the material is thrown outwardly therefrom by centrifugal force, the particles of rock being delivered against the buffer 17 and falling therefrom into the outer hopper 11, from which they escape through a pipe 34. The graphite flakes, being lighter than the particles of rock, are picked up by the air suction leading through the air box 13 and the duct 15 to the grading chamber 16, the graphite passing over an upwardly inclined guard or deflector 35 at the entrance into the grading chamber and falling through the conveyor 23 onto the upper and coarser screen 21. The brushes of the conveyor 23 convey the larger flakes along the screen 21 to the conduit 25, so that they will pass through said conduit to the receiver 28, while the smaller flakes descend through the screen 21 to the screen 22 and are moved along the latter until they are discharged through the conduit 26 to the receiver 29. While additional screens and conveyors may if desired be provided, I have shown only the two screens 21 and 22 and the conveyors thereabove, and in such instance the material passing through the lowermost screen is discharged through the fan housing 32, as it would eventually be if additional screens and conveyors were provided.

The inner hopper 12 beneath the spreader wheel 4 serves to receive such material as may not be light enough to be picked up by the air current extending through the air box 13 or heavy enough to be thrown outwardly to a degree causing it to be deposited in the outer hopper 11. Such material contains graphite, is discharged from the inner hopper through an outlet 36, and is recrushed and returned to the supply hopper to be again treated.

The moving parts of my apparatus may be operated in any suitable manner. As convenient and simple operating means, I have shown a motor 37 the shaft of which is provided with pulleys receiving a belt 38 leading to a pulley 39 on the spreader wheel shaft 2, and a belt 40 leading to a pulley 41 on a shaft 42 by which the lower conveyor 24 is driven. A crossed belt 43 extends from a second pulley on the shaft 42 to a pulley 44 on a shaft 45 by which the conveyor 23 is driven. The arrangement of the belts 40 and 43, as described, provides for the conveyors being driven in opposite directions to carry the flake graphite downwardly on the oppositely inclined screens 21 and 22.

I claim:

1. An apparatus for separating graphite from crushed mineral, comprising a separating chamber, means for delivering a mixture of graphite and crushed mineral into said chamber, a grading chamber provided with screens, a suction device whereby the graphite is drawn from said separating chamber and onto said screens, and traveling sweeping devices movable along said screens to distribute the graphite.

2. An apparatus for separating graphite from crushed mineral comprising a separating chamber, means for delivering a mixture of graphite and crushed mineral material into said chamber, a spreader wheel in said chamber adapted to centrifugally project the crushed mineral material so as to form a moving screen of material around said wheel, a conical deflector located above said spreader wheel and having a downwardly flared margin surrounding said spreader wheel and adapted to deflect the centrifugally thrown mineral outwardly and downwardly, a buffer surrounding and separated from said lower margin to receive the mineral deflected therefrom, said chamber having a graphite outlet above the course of the projected material and in communication with the space surrounded by said deflector, and means for causing a current of air to pass around said lower margin and thence into said graphite outlet.

In testimony that I claim the foregoing I hereunto affix my signature.

SWAN J. SWANSON.

Certificate of Correction.

It is hereby certified that the address of the assignee in Letters Patent No. 1,432,921, granted October 24, 1922, upon the application of Swan J. Swanson, of St. Louis, Missouri, for an improvement in "Apparatus for Separating Graphite," was erroneously given as "St. Paul, Missouri," whereas said address should have been given as *St. Louis, Missouri*, as shown by the records of assignments in this office; and that the said Letters Patent should be read with this correction therein that the same may conform to the record of the case in the Patent Office.

Signed and sealed this 5th day of December, A. D., 1922.

[SEAL.]                                             KARL FENNING,
*Acting Commissioner of Patents.*